United States Patent Office
3,397,208
Patented Aug. 13, 1968

3,397,208
METHOD FOR PREPARING 4-HYDROXY-6,7-DI-ALKOXY-3-CARBOALKOXYQUINOLINES AND NOVEL 4-CHLORO-6,7-DIALKOXY-3-CARBO-ALKOXYQUINOLINES USEFUL THEREIN
Harold Berman and Frank Frederick Ebetino, Norwich, N.Y., assignors to The Norwich Pharmacal Company, a corporation of New York
No Drawing. Filed Feb. 24, 1965, Ser. No. 435,091
8 Claims. (Cl. 260—287)

ABSTRACT OF THE DISCLOSURE

A method for preparing 4-hydroxy-6,7-dialkoxy-3-carboalkoxyquinolines is described which comprises reacting a dialkyl 3,4-dialkoxyanilinomethylene malonate with phosphorus oxychloride to effect ring closure of the anil. The use of excess phosphorus oxychloride results in the formation of the corresponding 4-chloro-6,7-dialkoxy-3-carboalkoxyquinolines which are converted to the 4-hydroxy compounds in acid medium.

---

This invention relates to a method for the preparation of certain 4-hydroxy-6,7-dialkoxy-3-carboalkoxyquinolines which are valuable agents in the control of coccidiosis in poultry when incorporated in poultry diet at a level from about 0.006% to about 0.1% by weight as described in copending application Ser. No. 380,058, filed July 2, 1964, now U.S. Patent 3,267,106, and owned by assignee of this application. It is also concerned with the production of novel compounds of the formula:

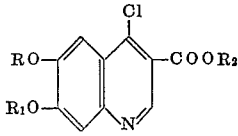

wherein R and $R_1$ stand for a $C_3$-$C_4$ hydrocarbon radical, and $R_2$ is a lower alkyl group. These compounds are valuable intermediates in the production of the corresponding 4-hydroxyquinolines.

It has been found that the above-referred-to 4-hydroxyquinolines may be readily produced by bringing together a dialkyl 3,4-dialkoxyanilinomethylenemalonate and a phosphorus oxyhalide such as phosphorus oxychloride. Depending on the conditions employed, the desired 4-hydroxyquinoline or the corresponding 4-chloro compound which is readily convertible to it can be recovered directly from the reaction mixture. When employing a reactant ratio of dialkyl 3,4-dialkoxyanilinomethylenemalonate to phosphorus oxychloride in equimolar, or slightly less, proportion and a reaction temperature range of from about 85°–100° for a period of about 1 to 2 hours; followed by dilution of the reaction mixture with a water immiscible solvent such as benzene; neutralization with an alkaline agent, for instance sodium hydroxide; and filtration, the 4-hydroxyquinoline may be obtained. This may be recrystallized from suitable solvents such as acetic acid or dimethylformamide. The unreacted dialkyl 3,4-dialkoxyanilinomethylenemalonate may be recovered from the organic phase of the reaction mixture by stripping the solvent and is available for further use.

When employing a reactant ratio of dialkyl 3,4-dialkoxyanilinomethylenemalonate to phosphorus oxychloride in the proportion of twice, or more, the molar amount of the chloride and a reaction temperature range of from about 95°–135° for a period of about two hours, followed by distillation of the reaction mixture to remove excess phosphorus oxychloride, if desired; quenching and neutralizing with an alkaline agent such as sodium hydroxide; the 4-chloro-6,7-dialkoxy-3-carboalkoxyquinoline may be recovered by filtration. If desired, the quenching step may be dispensed with. Following this course, the mixture is treated with a solvent such as methanol, ethanol or acetic acid, preferably in the presence of an alkaline agent and under the influence of heat. Suitable alkaline agents comprise alkali hydroxides, acetates or carbonates. In this manner, the 4-hydroxy-6,7-dialkoxy-3-carboalkoxyquinoline may be recovered from the reaction mixture by dilution of it with water and filtration or by filtration to remove inorganic salts followed by chilling of the filtrate.

The 4-chloro-6,7-dialkoxy-3-carboalkoxyquinoline, when prepared as aforesaid, can be readily converted to its corresponding 4-hydroxy compound by treatment with acid. In effectuating this conversion the 4-chloro-6,7-dialkoxy-3-carboalkoxyquinoline is contacted with an acid medium such as hydrochloric acid in the presence of an alkanol such as methanol or ethanol or with acetic acid, preferably in the presence of an alkaline acetate such as sodium acetate. In order to hasten the conversion, the reaction is preferably conducted under the influence of heat as at the reflux temperature of the reaction mixture.

In order that this invention may be readily understood by and may be available to those skilled in the art, the following illustrative examples are supplied.

Example I.—Methyl 4-chloro-6,7-diisopropoxy-3-quinolinecarboxylate 10.00 gms. of dimethyl 3,4-diisopropoxyanilinomethyl-enemalonate (0.0285 gm. mole) (prepared by reacting 3,4-diisopropoxyaniline with dimethyl methoxymethylenemalonate in ethanol under reflux and having a melting point of 56–57° after recrystallization from petroleum ether) is heated with agitation on a steam bath with 84 gms. of phosphorus oxychloride (0.546 mole) for 2 hours at an internal temperature of 95° C. After removing the excess phosphorus oxychloride by vacuum distillation, 50 cc. of methanol is added to the residue. The resulting solution is poured into 200 cc. of water. The mixture is neutralized with 30% aqueous sodium hydroxide. A solid which precipitates is separated, washed with water, and dried over calcium chloride to yield 9.50 gms. of title compound; M.P. 109–110° C. after recrystallization from methanol.

Analysis.—Found: C, 60.61%; H, 5.78%; Cl, 10.59%; N, 4.06%. Theory: C, 60.44%; H, 5.97%; Cl, 10.50%; N, 4.15%.

Example II.—Methyl 4-hydroxy-6,7-diisopropoxy-3-quinolinecarboxylate 1.55 gms. of methyl 4-chloro-6,7-diisopropoxy-3-quinolinecarboxylate (Example I) is refluxed in 10 cc. of methanol containing 5 drops of concentrated hydrochloric acid for 7⅔ hours. After cooling, the reaction mixture is poured into water. The precipitated solid is separated, washed with water and dried to yield 1.18 gms. (81%) of title compound; M.P. 253–256° C. after recrystallization from dimethylformamide.

Example III.—Ethyl 4-hydroxy-6,7-diisobutoxy-3-quinolinecarboxylate 20.75 gms. (0.05 mole) of diethyl 3,4-diisobutoxy-anilinomethylenemalonate (prepared as in Example I except 3,4-diisobutoxyaniline is used and having a melting point of 77–79° C.) is heated with 7.70 gms of phosphorus oxychloride (0.05 mole) with agitation on a steam bath at a temperature of 96–97° C. for 1¼ hours. The amber syrupy reaction mixture is diluted with 73 cc. of benzene and then poured into 150 gms. of ice. After the ice and benzene becomes molten, the mixture is neutralized with 16 cc. of 30% sodium hydroxide. A solid precipitates. The three-phase system of benzene, water and solid is filtered. The solid is washed with 10 cc. benzene followed by 30 cc. warm ethanol, followed by water. The solid after being dried at 100° C. gives 5.32 gms. (29.5%) of title product.

The organic phase is separated from the aqueous phase of the filtrate. It is washed with water, dried over anhydrous sodium sulfate and stripped of benzene. There are recovered 14.01 gms. (67.5%) of the malonate.

Example IV.—Ethyl 4-hydroxy-6,7-diisobutoxy-3-quinolinecarboxylate 407 gms. of diethyl 3,4-diisobutoxyanilinomethylenemalonate (1.0 mole) is heated with 306 gms. of phosphorus oxychloride (2.0 moles) on a steam bath holding the temperature at 95–100° C. for 2 hours. The reaction mixture is poured into 3 liters of cold water with good agitation. The mixture is neutralized with 645 cc. of 30% aqueous sodium hydroxide to a pH of 7 holding the temperature between 20–30° C. The precipitated solid is separated, washed with water, and dried at 60° C., yielding 378 gms. It consists predominantly of ethyl 4 - chloro - 6,7 - diisobutoxyquinolinecarboxylate having a M.P. of 99–100° C. after recrystallization from benzene-hexane mixture and having the following analysis:

Calculated: C, 63.23; H, 6.90; Cl, 9.33. Found: C, 63.31; H, 6.96; Cl, 9.16.

76 gms. of this solid is refluxed with 291 gms. of acetic acid at 120–121° C. for ½ hour in which there has been dissolved 8.0 gms. of sodium hydroxide (0.20 mole) and 20.4 gms. of acetic anhydride. A solid precipitates during the reaction period. After cooling to 17° C., the solid is separated, washed with benzene followed by water, until the aqueous filtrate is chloride negative. The solid is dried at 100° C. to give 57 gms. of ethyl 4 - hydroxy - 6,7 - diisobutoxy - 3 - quinolinecarboxylate (78.6%, based on the starting malonate).

Example V.—Ethyl 4-hydroxy-6,7-diisobutoxy-3-quinolinecarboxylate 41 gms. of diethyl 3,4-diisobutoxyanilinomethylenemalonate (0.10 mole) is heated with 343 gms. of phosphorus oxychloride (2.24 moles) on a steam bath at 97.5–99° C. for 2 hours. The excess phosphorus oxychloride is removed by distillation.

To a reaction residue, 100 cc. of xylene, 53 gms. of glacial acetic acid, and 56 gms. of anhydrous sodium acetate are added. The mixture is refluxed at 120–123° C. for four hours. After cooling, 225 cc. water is added and the mixture agitated until the water-soluble components dissolve. The insoluble solid is separated, washed with xylene, followed by water and the product dried at 100° C. to give 32 gms. (86.7%) of title compound.

Example VI.—Methyl 4-hydroxy-6,7-diisopropoxy-3-quinolinecarboxylate

A similar procedure as in Example V is followed to make the title compound. 200 gms. of dimethyl 3,4-diisopropoxyanilinomethylenemalonate (.570 mole) is reacted with 1675 gms. of phosphorus oxychloride. 308 gms. of reaction product remains after removing the excess phosphorus oxychloride. 52.5 gms. of this residue is removed and reacted as in the preceding Example V with 53 gms. of acetic acid and 56 gms. of anhydrous sodium acetate in 100 cc. xylene at 123–126° C. for four hours. The title product is isolated as in the preceding Example V and weighs 26.5 gms. (83.7%).

Example VII.—Ethyl 4-hydroxy-6,7-diisobutoxy-3-quinolinecarboxylate 407 gms. of diethyl 3,4-diisobutoxyanilinomethylenemalonate (1.0 mole) is heated with 306 gms. (2.0 moles) of phosphorus oxychloride on a steam bath at 97–101° C. for 2 hours.

The reaction residue weighs 658 gms. 130 gms. of this is removed and refluxed with 964 gms. of glacial acetic acid at 120–125° C. for ½ hour in which there is dissolved 94.5 gms. of potassium carbonate and 73.5 gms. of acetic anhydride. The inorganic salts are separated from the hot liquid and washed with 500 cc. to 1 liter of acetic acid at 115–118° C. The combined filtrate and wash is concentrated by vacuum distillation to 700 gms. The solution is allowed to crystallize at 16–20° C. The product is separated, washed with cold acetic acid followed by water until the aqueous filtrate is chloride free. The product is dried at 100° C. to give 48.5 gms. (68%) of title compound.

Example VIII.—Ethyl 4-hydroxy-6,7-diisobutoxy-3-quinolinecarboxylate 20.7 gms. (0.05 mole) of diethyl 3,4-diisobutoxyanilinomethylenemalonate and 15.3 gms. (.10 mole) of phosphorus oxychloride are heated in a steam bath at 93–95° C. for 2 hours. The excess phosphorus oxychloride is removed by distillation.

To the acidic reaction residue, 100 cc. of ethanol and 0.95 ml. of water are added. The mixture is refluxed for 9 hours. The reaction is cooled to room temperature and neutralized to pH 5–6 with 85 cc. of a saturated sodium hydroxide-ethanol solution. The resultant solid is filtered and washed with hot ethanol, followed by water until chloride free. The solid is dried at 100° C. to give 13.92 gms. (77.2%) of title product.

What is claimed is:

1. A compound of the formula:

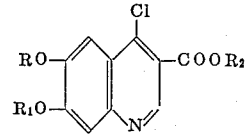

wherein R and $R_1$ each stand for $C_3$–$C_4$ lower alkyl, and $R_2$ is a lower alkyl group.

2. Methyl 4 - chloro - 6,7 - diisopropoxy - 3 - quinolinecarboxylate.

3. Ethyl 4 - chloro - 6,7 - diisopropoxy - 3 - quinolinecarboxylate.

4. The method of making a compound of the formula:

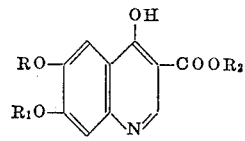

wherein R and $R_1$ each stand for lower alkyl, and $R_2$ is a lower alkyl group which comprises contacting a compound of the formula:

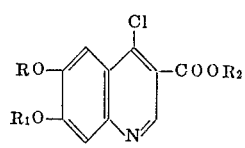

wherein R, $R_1$, and $R_2$ have the foregoing significance with an acid medium selected from the group consisting of (1) methanol or ethanol containing hydrochloric acid and (2) acetic acid in the presence of an alkaline agent.

5. The method of making a compound of the formula:

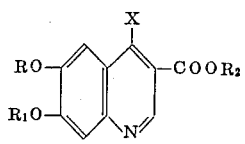

wherein R and $R_1$ each stand for lower alkyl; $R_2$ is a lower alkyl group; and X is a member of the group consisting of hydroxy and chloro, which comprises reacting a compound of the formula:

$$RO-\underset{R_1O}{\overset{}{\bigcirc}}-NHCH=C(COOR_2)_2$$

wherein R, $R_1$, and $R_2$ have the foregoing significance with phosphorus oxychloride in a mol ratio of 1:1 and less whereby X is hydroxy and in a mol ratio of 1:2 and more whereby X is chloro.

6. The method of making a compound of the formula:

$$\underset{R_1O}{\overset{RO}{\bigcirc}}\underset{N}{\overset{Cl}{\bigcirc}}-COOR_2$$

wherein R and $R_1$ each stand for lower alkyl, and $R_2$ is a lower alkyl group which comprises reacting a compound of the formula:

$$RO-\underset{R_1O}{\overset{}{\bigcirc}}-NHCH=C(COOR_2)_2$$

wherein R, $R_1$, and $R_2$ have the foregoing signficance with phosphorus oxychloride in a mol ratio of about 1:2.

7. The method of making a compound of the formula:

$$\underset{R_1O}{\overset{RO}{\bigcirc}}\underset{N}{\overset{OH}{\bigcirc}}-COOR_2$$

wherein R and $R_1$ each stand for lower alkyl and $R_2$ is a lower alkyl group which comprises reacting a compound of the formula:

$$RO-\underset{R_1O}{\overset{}{\bigcirc}}-NHCH=C(COOR_2)_2$$

wherein R, $R_1$ and $R_2$ have the foregoing significance with phosphorus oxychloride in a mol ratio not exceeding 1:1.

8. The method of making a compound of the formula:

$$\underset{R_1O}{\overset{RO}{\bigcirc}}\underset{N}{\overset{OH}{\bigcirc}}-COOR_2$$

wherein R and $R_1$ each stand for lower alkyl and $R_2$ is a lower alkyl group which comprises subjecting the reaction mixture resultant to the interaction of a compound of the formula:

$$RO-\underset{R_1O}{\overset{}{\bigcirc}}-NHCH=C(COOR_2)_2$$

wherein R, $R_1$, and $R_2$ have the aforesaid significance and phosphorus oxychloride to the action of an acid medium selected from the group consisting of (1) methanol or ethanol containing hydrochloric acid and (2) acetic acid in the presence of an alkaline agent and under the influence of heat.

References Cited

UNITED STATES PATENTS

| | | | |
|---|---|---|---|
| 2,614,121 | 10/1952 | Price et al. | 260—287 X |
| 3,267,106 | 8/1966 | Watson | 260—287 |

FOREIGN PATENTS

| | | |
|---|---|---|
| 1,070,223 | 6/1967 | Great Britain. |
| 1,070,333 | 6/1967 | Great Britain. |

OTHER REFERENCES

Rowlett et al.: J. Am. Chem. Soc., vol. 68, pp. 1288–90 (1946).

Riegel et al.: J. Am. Chem. Soc., vol. 68, pp. 1264–6 (1946).

Price et al.: J. Am. Chem. Soc., vol. 68, pp. 1246–9 (1946).

Tarbell et al.: J. Am. Chem. Soc., vol. 68, p. 1277 (1946).

NICHOLAS S. RIZZO, Primary Examiner.

DONALD G. DAUS, Assistant Examiner.